Patented June 4, 1935

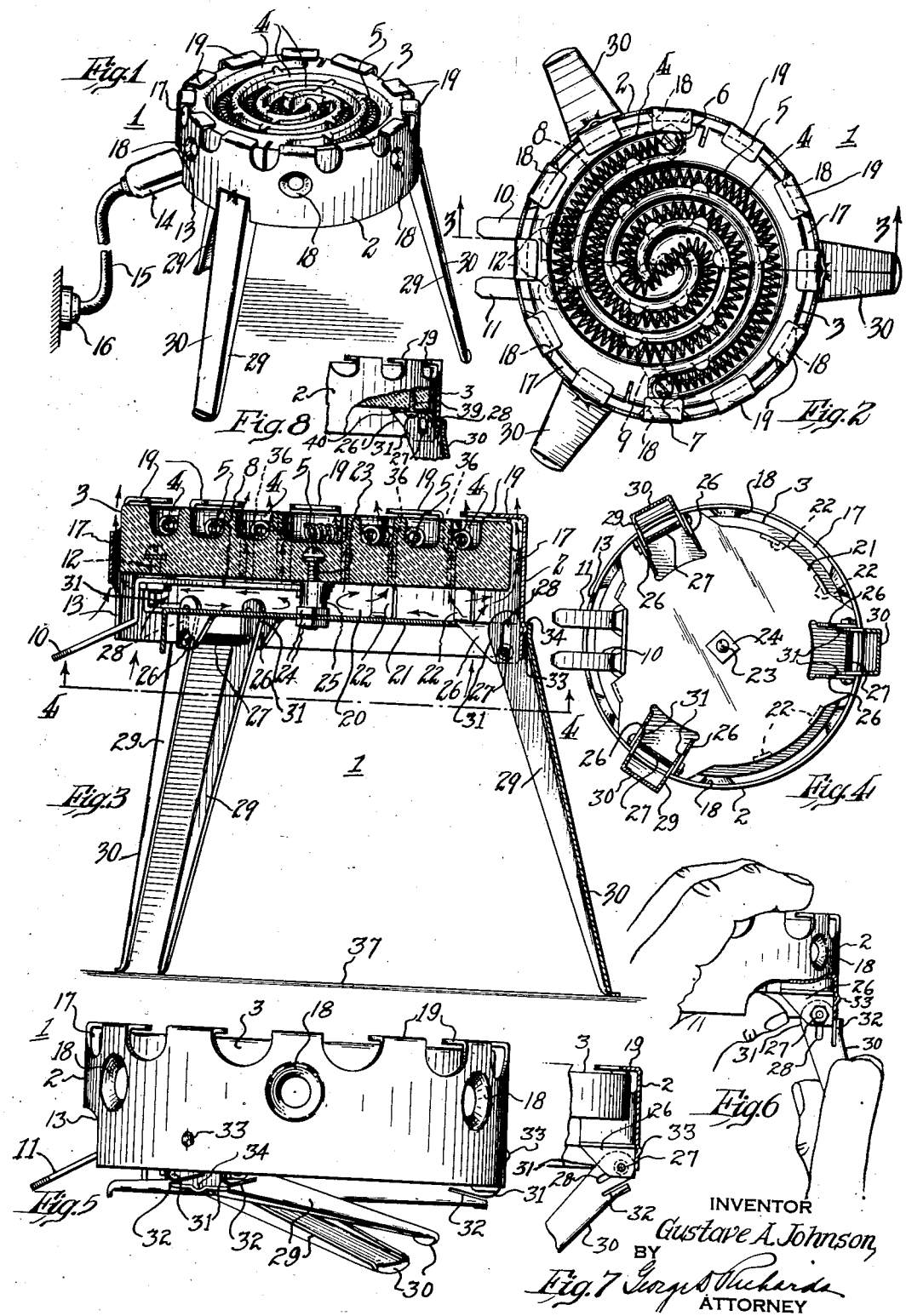

2,003,714

UNITED STATES PATENT OFFICE 2,003,714

PORTABLE ELECTRIC HEATER

Gustave A. Johnson, Newark, N. J., assignor to Electrical Patent Holding Corporation, New York, N. Y., a corporation of New York Application April 20, 1933, Serial No. 666,949

2 Claims. (Cl. 219—37)

This invention relates, generally, to electric heaters; and the invention has reference, more particularly, to a novel improved portable electric heater.

Heretofore, electric heaters used for cooking and for other purposes have generally been so large and cumbersome that the same cannot be readily carried from place to place and hence their use has been restricted to fixed locations.

The principal object of the present invention is to provide a novel portable electric heater which is readily portable, the same occupying but little space when stored, and may even be carried in the pocket of the user, the said heater being adapted to be set up for use in a moment's time.

Another object of the present invention lies in the provision of a novel portable electric heater of the above character adapted to produce an intense heat in use for effectively performing culinary and other operations, the said heater having novel folding legs adapted to fold flat against the body of the heater when the same is stored.

Another object of the present invention is to provide a novel portable electric heater of the above character which is so constructed and arranged as to employ air currents operating by convection in addition to direct heat radiation for effectively transferring heat to the object desired to be heated at any time, the said air currents being also employed for cooling the casing of the heater and for preventing the undue heating of the surface supporting the heater.

Other objects of this invention, not at this time more particularly enumerated, will be clearly understood from the following detailed description of the same.

The invention is clearly illustrated in the accompanying drawing, in which:

Fig. 1 is a perspective view of the novel portable electric heater of the present invention shown connected to an electric outlet as in use.

Fig. 2 is a plan view of the heater illustrated in Fig. 1.

Fig. 3 is an enlarged sectional view taken substantially along line 3—3 of Fig. 2 looking in the direction of the arrows.

Fig. 4 is a reduced sectional view taken along line 4—4 of Fig. 3 looking in the direction of the arrows.

Fig. 5 is a view in elevation showing the appearance of the heater with the legs thereof in their folded positions.

Figs. 6 and 7 are fragmentary views illustrating the manner of folding the legs of the heater; and Fig. 8 is a fragmentary view with parts broken away showing a slightly modified form of construction.

Similar characters of reference are employed in all of the above described views, to indicate corresponding parts.

Referring now to the said drawing, the reference numeral 1 designates the novel portable electric heater of the present invention as a whole. Heater 1 comprises a substantially cylindrical casing or shell 2 which is open at its top and bottom. A cylindrical heater unit or hot plate 3 is contained within the hollow interior of casing 2. The hot plate or heater unit 3 is made of suitable refractory and electrical insulating material, such as asbestos cement, and has its upper surface provided with spiral grooves 4, within which is positioned a coiled electrical resistance wire 5. The ends of resistance wire 5 are connected to terminal posts 6 and 7 which are electrically connected respectively to electrical conducting strips 8 and 9 positioned on the under surface of the heater unit 3.

Conducting strips 8 and 9 are illustrated as integrally connected to terminal prongs 10 and 11, which prongs have their inner portions attached as by screws 12 to the under surface of the heater unit 3 and have their outer end portions projecting outwardly through an aperture 13 provided in the wall of casing 2 for receiving an electric socket member 14. Socket member 14 is connected by lead 15 to the usual plug 16 that is adapted to be inserted into a convenience outlet, as is well known.

The heater unit or hot plate 3 is of lesser diameter than the internal diameter of casing 2, so that there is provided an annular air circulating space 17 between the heater unit and the shell 2. In order to maintain the desired space 17 between the inner surface of the shell side walls and the peripheral surface of the heater unit, the shell 2 is provided with a plurality of circumferentially arranged and angularly spaced, inwardly directed apertured bosses or spacing elements 18, which bosses not only serve to space all parts of the periphery of the heater unit inwardly away from the walls of the shell 2, but also serve to grip the heater unit to thereby retain the heater unit and the shell 2 in fixed positions with respect to one another. The heater unit 3 is provided with a plurality of vertical apertures or vents 36 which serve to provide for an upward flow of air through the heater unit in use.

The upper part of the shell 2 is provided with a plurality of mutually spaced tongues 19 that have their upper portions bent over into overlying relation with respect to the upper peripheral edge portion of the heater unit 3, whereby these upper bent over portions of the tongues 19 serve to support vessels and other articles placed upon the heater in use.

A sheet metal bottom plate member 21 is positioned below the heater unit 3 within casing 2. Bottom plate member 21 is formed with upturned lugs 22 which serve to space this bottom plate member 21 a desired distance from the under surface of the heater unit, to thereby provide a space 20 for the circulation of air between the heater unit and this bottom plate member as will further appear. The bottom plate member 21 is held in assembled relation with the heater unit 3 by a screw 23 that has its upper portion embedded in the heater unit 3 and its lower portion provided with nuts 24 for securing the bottom plate member thereto. A spacer member 25 is shown provided upon the screw 23 for aiding in spacing the bottom plate member 21 from the heater unit 3. The bottom plate member 21 is formed with three pairs of down-turned ears 26, which ears are struck downwardly from the body of the bottom plate member 21 as especially shown in Fig. 4.

The two ears 26 of each pair of ears are spaced a sufficient distance apart from each other to receive therebetween tongues 31 formed on side flanges 29 of legs 30. The two ears of each pair have aligned circular apertures for conformably receiving and holding a pivotal bolt 27, which bolt also extends through slots 28 provided in the tongues 31 of each leg 30. The legs 30 are illustrated as spaced angularly 120° from one another about the central vertical axis of the heater, but it is to be understood that a greater number of these legs may be used, if desired, in which case the angular spacing of the legs would be decreased. The side flanges 29 of each leg are provided with slots 32 (see especially Figs. 5 to 7) adjoining the tongues 31, which slots are of sufficient width to receive the wall of casing 2 therein.

When the heater is in its useful position shown in Figs. 1 to 4, the lower portion of casing 2 projects downwardly into the slots 32 and the bolts 27 engage the bottoms of slots 28 of the legs. The lower portion of the casing 2 is provided with three outstruck bosses 33, which bosses are positioned so as to snugly engage conforming grooves 34 provided in the upper portions of legs 30 when these legs are in their useful outturned positions shown in Figs 1 to 4. Thus, when the legs 30 are in their out-turned useful positions, the lower edge portion of the casing 2 is gripped between the inner edges of slots 32 and the recesses 34, so that the legs 30 are firmly held in their useful positions. The bolts 27 by engaging the bottoms of slots 28 also serve to enhance the rigidity with which the legs 30 grip the casing 2. It will be noted that resilient pressure is exerted between bosses 33 and recesses 34 so that the inner edges of slots 32 press againt the inner walls of casing 2, whereas the depressions 34 press against the bosses 33, thereby securing a very firm grip, resulting in great stability of the standing heater.

When it is desired to store the heater as when carrying the same from place to place, the legs 30 are folded against the under surface of the bottom member 21. To accomplish this, the heater is gripped as shown in Fig. 6 and each leg is pulled downwardly causing its depression 34 to disengage boss 33 and also causing slot 32 to move out of engagement with the wall of casing 2. After the leg has been pulled downwardly into the position shown in Fig. 6, it may be turned inwardly as shown in Fig. 7 until the same is flat against the bottom member 21 as shown in Fig. 5, the turning of the leg being permitted by the turning of the upper ends of slots 28 upon the bolt 27. When it is desired to again set up the heater for use, each leg is turned outwardly and then pushed upwardly so that the lower portion of the casing 2 will enter slots 32 and thereafter boss 33 will engage in depression 34, thereby rigidly locking the leg in its outturned supporting position.

In use, when plug 16 is inserted into a convenience outlet, current is supplied to the coiled resistance wire 5 which becomes intensely hot and throws a great amount of heat upwardly and upon the object being heated. Owing to the redness of the coiled wire 5, considerable heat is transmitted to the object heated by direct radiation. The hot plate 3 holding the coiled wire 5 soon becomes quite hot but, owing to the presence of the annular air circulating space 17 surrounding the sides of the hot plate and to the presence of the air space 20 below this hot plate, relatively little heat is transmitted to casing 2 so that this casing remains relatively cool as is desired.

The hot plate 3, due to its high temperature, sets up currents of air in spaces 20 and 17, which currents of air flow in the directions of the arrows in Fig. 3. Thus, air passes upwardly through the space extending between the bottom plate member 21 and the casing 2 and then flows through the space 20 extending under the hot plate and over the bottom plate member 21. From the space 20, wherein the air becomes heated somewhat, the warmed air flows upwardly by convection through the annular space 17 and through vents 36 in the hot plate, thereby absorbing considerable heat from the hot plate and becoming quite hot. This hot air then passes upwardly and against the object being heated, thereby hastening the heating of such object.

Owing to the flow of air through the heater in use, the intense heat of the hot plate or heater unit is not transmitted to casing 2 and bottom plate member 21, so that the heater does not seem unduly hot to persons standing near by and the surface 37 upon which the heater rests is not injured or charred. When the plug 16 is removed from the convenience outlet, the heater cools almost immediately, thereby allowing the legs 30 to be folded flat against the bottom plate member 21, if desired, ready for storing or carrying about.

Owing to the novel construction of the legs 30 having the casing receiving slots 32 therein together with the depressions 34 for engaging bosses 33, the heater is very stable when set up for use, and at the same time, by merely pulling the legs 30 downwardly from the main body of the heater, these legs may be turned inwardly into their out of the way positions, as shown in Fig. 5. The heater may then be put into one's pocket and carried about, if desired.

Although the heater has been described as particularly suitable for heating objects and for cooking purposes, it will be apparent that the same may be used satisfactorily for heating rooms, if desired, the circulation of air through the heater by convection enhancing the value of the heater for this purpose.

It will be apparent that instead of using a single pivotal bolt 27 for connecting the tongues 31 of a leg to a pair of ears 26, a pair of pivotal bolts or rivets may be used for this purpose, in which case each pivotal bolt or rivet would extend through one tongue 31 and an adjoining ear 26. It will also be apparent that, if desired, the bottom plate member 21 may be omitted, in which case the bolts 27 and legs 30 will be carried as by U-shaped brackets 40 (see Fig. 8) having down-turned ears 26' similar to ears 26 already described. The U-shaped brackets 40 are illustrated in Fig. 8 as secured directly to the undersurface of hot plate 3 by means of screws 39.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

What is claimed is:

1. In a portable electric heater of the character described having a heater unit, a casing for said heater unit, said casing being open at its top and bottom, a bottom plate member substantially closing the bottom of said casing, said bottom plate member having down-turned ears thereon, folding legs having tongues provided with slots therein and cooperating with said ears, hinged pintles extending through said ears and through the slots in said leg tongues for hingedly connecting said legs to said bottom plate member, said legs being arranged to be turned either inwardly into folded position upon said bottom plate member or outwardly for supporting said casing, said legs having recesses therein for receiving portions of said casing when said legs are in their out-turned positions to thereby lock said legs in supporting relation to said casing, said casing and said legs having cooperating projections and depressions, respectively, for rigidly locking said legs in their out-turned positions.

2. In a portable electric heater of the character described having a heater unit, a casing for said heater unit, said casing being open at its top and bottom and having its side walls spaced outwardly from said heater unit, a bottom plate member fixed upon said heater unit in spaced relation with respect to the bottom of said heater unit, said bottom plate member substantially closing the bottom of said casing and having depending ears thereon, folding legs having their upper ends connected for pivotal and limited sliding movement upon said ears, said legs being arranged to be turned either radially inwardly into folded position upon said bottom plate member or outwardly for supporting said casing, said legs having slots thereon for receiving portions of said casing when said legs are in their out-turned positions to thereby lock said legs in supporting relation to said casing.

GUSTAVE A. JOHNSON.